United States Patent [19]

Fischer

[11] Patent Number: 5,434,207

[45] Date of Patent: Jul. 18, 1995

[54] PLASTICIZER-CONTAINING POLYVINYLBUTYRALS WITH IMPROVED ADHESION-REDUCING PROPERTIES WITH RESPECT TO SILICATE GLASS, PROCESSES FOR THEIR PREPARATION AND THEIR USE

[75] Inventor: Hannes Fischer, Taunusstein, Germany

[73] Assignee: Hoechst Aktiengesellschaft, Germany

[21] Appl. No.: 216,662

[22] Filed: Mar. 23, 1994

[30] Foreign Application Priority Data

Mar. 25, 1993 [DE] Germany ............... 43 09 638.7

[51] Int. Cl.⁶ ............... C08L 29/14; C08L 93/00
[52] U.S. Cl. ............... 524/270; 428/436; 428/437; 524/272; 524/274; 524/399
[58] Field of Search ............ 524/270, 272, 274, 399; 428/436, 437

[56] References Cited

U.S. PATENT DOCUMENTS 3,855,055 12/1974 Kanno et al. ............... 161/199
4,287,107 9/1981 Hermann et al. ............ 428/437 X

FOREIGN PATENT DOCUMENTS 0010718 10/1979 European Pat. Off. .
441052 1/1936 United Kingdom .

*Primary Examiner*—D. S. Nakarani
*Attorney, Agent, or Firm*—Bierman and Muserlian

[57] ABSTRACT

Preparation of plasticizer-containing polyvinylbutyrals (PVB) which are suitable for the production of elastic interleaving films with improved adhesion-reducing properties for laminated glass panes of siliceous glass. They comprise, as adhesion-reducing additives, active amounts of salts of metals of groups Ia, IIa, IIb and IIIa of the periodic table of the elements and naturally occurring resin acids or derivatives of resin acids, and, if appropriate, customary stabilizers and auxiliaries. They are prepared by mixing the components and plasticizing the component mixtures. They can be shaped thermoplastically by customary methods and are suitable for the production of plasticized PVB films which have advantageously improved adhesion-reducing properties with respect to siliceous glass panes and can advantageously be used for the production of siliceous laminated glass panes.

14 Claims, No Drawings

PLASTICIZER-CONTAINING POLYVINYLBUTYRALS WITH IMPROVED ADHESION-REDUCING PROPERTIES WITH RESPECT TO SILICATE GLASS, PROCESSES FOR THEIR PREPARATION AND THEIR USE

BACKGROUND OF THE INVENTION

The invention relates to plasticizer-containing polyvinylbutyrals (PVB) which are suitable for the production of elastic interlayer films with improved adhesion-reducing properties for laminated glass panes of siliceous glass and can advantageously be used for the production of laminated glass. They comprise, as adhesion-reducing additives, active amounts of salts of metals of groups Ia, IIa, IIb and IIIa of the periodic table of the elements and naturally occurring resin acids or derivatives of resin acids, and, if appropriate, customary stabilizers and auxiliaries. They can be shaped thermoplastically by customary methods and are preferably suitable for the production of plasticized PVB films which have advantageously improved adhesion-reducing properties with respect to siliceous glass panes.

STATE OF THE ART

As is known, plasticized plasticizer-containing polyvinylbutyral films (PVB films), the plasticizer content of which is preferably 20 to 60% by weight, in particular 30 to 45% by weight, based on the content of polyvinylbutyral (PVB), are preferably used as interlayer films for siliceous laminated glass panes. The plasticizer-containing PVB films furthermore comprise, inter alia, about 0.2 to 0.8% by weight, based on the plasticized film composition, of water, the water content in each case depending, inter alia, on the previous storage conditions of the finished film.

The most important task of interlayer films or layers in siliceous laminated glass panes is to absorb any impact energy acting on the laminated glass panes and in this way to improve the breaking strength of the panes. Particularly high requirements in respect of breaking strength and protection from splintering are imposed in this context, for example, on laminated safety glass panes which are to be used in the automobile industry, so that impacting objects, such as, for example, stones, as far as possible cannot break through the panes and the vehicle occupants cannot be injured by glass splinters.

It is known that the optimum breaking strength of laminated glass panes does not coincide with the maximum adhesive strength of the plasticizer-containing PVB films on siliceous glass. Instead, the breaking strength maximum is within a limited range with reduced glass adhesive strength of the plasticizer-containing PVB interlayer films.

To achieve the most favorable breaking strength of glass laminates, certain substances which reduce adhesion of the film to siliceous glass panes to the required extent are usually added to the plasticized PVB interlayer films. Adhesion regulators can be added during or after production of the films, in the latter case, for example, by immersing the film in a bath which contains the adhesion regulators in dissolved form.

Known adhesion-reducing agents, so-called anti-adhesives, are hydroxides, carboxylic acid salts and chelates of metals from groups Ia, IIa and IIIa of the periodic table of the elements and also of zinc and lead. Known anti-adhesives are, for example, formates and acetates of potassium, magnesium and calcium, alkali metal phthalates, and magnesium salts, calcium salts and zinc salts of neodecanoic acid and of 2-ethylbutyric acid (cf., for example, DE-OS 29 04 043 and EP-OS 0 373 139).

Although compounds of the type mentioned can as a rule reduce the adhesion between siliceous glass panes and plasticized PVB laminated films, they have a number of disadvantages which impair their technical use. Thus, alkaline alkali metal and/or alkaline earth metal salts of lower carboxylic acids often cause a deepening in the color of the film material during production thereof by thermoplastic shaping, and furthermore, together with the water present in the film composition, can lead to hydrolysis of ester groups in the plasticizers. Moreover, it is generally difficult to distribute the metal salts of the carboxylic acids usually used, which are employed in only very low concentrations, uniformly in the plasticized PVB film composition, since in general they are insoluble or only slightly soluble therein. A considerable disadvantage of the known adhesion regulators based on metal carboxylate, which are in general hydrophilic, is also that they increase the water-sensitivity of plasticized PVB laminated films, which can lead to clouding and a loss of adhesion in the glass laminates.

SUMMARY OF THE INVENTION

The present invention was thus based on the object of providing plasticizer-containing PVB films for use as interlayer films in siliceous laminated safety glass panes, which films comprise as adhesion regulators, for adjusting the optimum adhesion intensity with respect to siliceous glass panes, those additives which do not have the abovementioned disadvantages in the films.

This aim can be achieved according to the present invention by employing, as adhesion-reducing substances, salts of metals from groups Ia, IIa, IIb and IIIa of the periodic table of the elements with resin acids or derivatives of resin acids.

The invention therefore relates to plasticizer-containing polyvinylbutyrals which are suitable for the production of interlayer films for laminated glass panes of siliceous glass and comprise adhesion-reducing additives and, if appropriate, customary stabilizers and auxiliaries, which polyvinylbutyrals comprise, as adhesion-reducing additives, salts of metals from groups Ia, IIa, IIb and IIIa of the periodic table of the elements with naturally occurring resin acids or derivatives of resin acids. The content of metal salts of resin acids or resin acid derivatives is preferably 0.01 to 0.2% by weight, in particular 0.015 to 0.1% by weight, particularly preferably 0.02 to 0.06% by weight, based on the plasticized plasticizer-containing polyvinylbutyral. Contents of metal salts from the group consisting of polyvalent cations, in particular calcium salts, magnesium salts or zinc salts of resin acids or resin acid derivatives, are preferred. Contents of metal salts of colophony are particularly preferred.

Resin acids are to be understood as meaning naturally occurring resin acids or natural resins. These are in general isomer mixtures of, inter alia, abietic acid, such as occur in nature in tree resins, for example in colophony. Constituents of these isomer mixtures which may be mentioned are, in addition to abietic acid, for example, levopimaric acid, pimaric acid, isopimaric acid, palustric acid and neoabietic acid. The resin acids can also be partly or completely hydrogenated or dimerized. They can furthermore be partly disproportionated, disproportionation being understood as meaning intermolecular displacement of ethylenic double bonds. The molecules of the resin acids or resin acid derivatives on which the resin acid metal salts according to the invention are based preferably contain at least 20 carbon atoms.

Salts of the abovementioned metals with reaction products of resin acids and aldehydes are also particularly suitable for use according to the invention. They can be prepared, for example, in accordance with DE-C 27 55 825. For this purpose, for example, resin acids are first reacted with preferably 0.1 to 12% by weight, based on the resin acids, of an aldehyde under increased pressure at temperatures of between 100° and 200° C. The reaction is then continued by heating the reaction mixture to 200° to 250° C. under normal pressure, with partial esterification of carboxyl and hydroxymethyl groups up to an acid number (in accordance with DIN 53402) of 115 to 135. The resulting reaction product is then converted into the desired metal salt.

Aliphatic ($C_1$–$C_7$)-aldehydes, benzaldehyde, furfural or glyoxal are preferably employed as aldehydes for this modification, according to the invention, of the resin acids. Formaldehyde, which can be employed in monomeric, oligomeric or polymeric form, is particularly preferably used.

The metal salts, used according to the invention, of resin acids and resin acid derivatives are preferably formed by addition of, for example, oxides, hydroxides, carbonates or acetates of the metals to be used according to the invention, if appropriate also of mixtures of the metal compounds mentioned, to the resin acids or resin acid derivatives at temperatures of more than 200° C., but preferably not higher than 260° C.

In addition, other processes for salt formation, for example reaction of alkaline aqueous solutions of resin acids or of resin acid derivatives with salts of polyvalent metal ions according to the invention, are also possible.

The carboxyl groups present in the chemically modified, if appropriate from natural resins, resin acids are converted according to the invention to the extent of at least 50 mol percent, preferably to the extent of more than 60, in particular to the extent of more than 80, and particularly preferably up to 100 mol percent, into the salt form with the metal cations according to the invention. At lower degrees of conversion into the salt form, it is to be expected that some of the natural resin acid component does not participate in the salt formation and therefore cannot contain the adhesion-reducing action according to the invention. Resin acids and resin acid derivatives in the non-neutralized free acid form show practically no usable adhesion-reducing action.

It is also possible, and in some cases can be advantageous, additionally to incorporate ethylenically unsaturated carboxylic acids or condensation products of phenols and aldehydes into the resin acid metal salts according to the invention. This can preferably be achieved by addition of the corresponding components to the natural resin melt or natural resin acid metal and reaction of the reactants at temperatures of between 100° and 280° C., preferably between 150° and 250° C. The addition can be carried out optionally before or after salt formation of the natural resin acids.

The ethylenically unsaturated carboxylic acids are employed in amounts of 0.1 to not more than 3% by weight, preferably 0.2 to 1% by weight, and the phenol-aldehyde condensation products are employed in amounts of 0.1 to not more than 10% by weight, preferably 0.2 to 3% by weight, in each case based on the metal salt of the natural resin acids.

Ethylenically unsaturated carboxylic acids which are employed are, preferably, ($C_3$–$C_{18}$)-monocarboxylic acids or -dicarboxylic acids, in particular fumaric acid, maleic acid, maleic anhydride, itaconic acid, acrylic acid, methacrylic acid and cinnamic acid. Maleic anhydride and acrylic acid are particularly preferred.

Both products of the novolak type and those of the resol type can be employed as phenol-aldehyde condensation products. The phenol components used for the preparation of the condensation products are preferably phenol, ($C_1$–$C_{12}$)-alkylphenols, preferably cresol or butyl-, octyl-or nonylphenol, and furthermore phenylphenol and diphenylolpropane. Phenol is particularly preferably used. Aliphatic ($C_1$–$C_7$)-aldehydes, benzaldehyde, furfural or glyoxal are preferably used as the aldehyde components. Formaldehyde, which can be employed in monomeric, oligomeric or polymeric form, is particularly preferably used.

The adhesion-reducing action of the salts, according to the invention, of resin acids or resin acid derivatives in plasticized PVB films is very greatly pronounced with respect to siliceous glass panes. Additions of preferably only 0.01 to 0.2% by weight, in particular 0.015 to 0.1 and particularly preferably 0.02 to 0.06% by weight, based on the total plasticized plasticizer-containing PVB film composition, are therefore necessary to reduce the adhesion of plasticized PVB interlayer films to siliceous glass panes to an optimum value for achieving the highest possible breaking strength of glass pane laminates.

The metal salts, according to the invention, of resin acids or of resin acid derivatives have a considerable advantage over most of the known adhesion regulators, inter alia, by the fact that, because they already have a very good solubility in the customary PVB plasticizers in the cold, they can easily be incorporated and uniformly distributed as a solution in the plasticizer into the PVB film compositions to be plasticized. However, it is also possible to apply the adhesion regulators according to the invention to the plasticized PVB films by immersion of extruded plasticizer-containing PVB films, which comprise customary stabilizers and auxiliaries if appropriate, in a solution of metal salts, according to the invention, of resin acids or of resin acid derivatives in an organic solvent and then to dry the films. Suitable organic solvents here are preferably, for example, aromatics, in particular toluene or xylene, and furthermore esters, preferably, for example, butyl acetate, as well as ethers, preferably, for example, diethylene glycol dimethyl ether. Both application methods mentioned are preferred variants of the addition of adhesion regulators according to the invention to the plasticizer-containing PVB molding compositions.

It is furthermore surprising that, in spite of the intrinsic color of abietic acid and abietic acid derivatives, the use of metal salts according to the invention prepared therefrom as adhesion regulators in plasticized plasticizer-containing PVB films causes no yellow or brown colorations in the latter, but instead leads to completely colorless films of surprisingly advantageous optical quality, these films furthermore having an improved color shade stability under the action of high temperatures and/or severe shear stress, such as may occur during the thermo-plastic production and processing processes.

Another advantage of metal salts, according to the invention, of resin acids and of resin acid derivatives in their use as adhesion regulators in plasticized plasticizer-containing PVB interlayer films for siliceous laminated glass panes is that, in contrast to many lower carboxylic acid or dicarboxylic acid salts known to be employed as adhesion regulators, they do not increase the sensitivity of the plasticized plasticizer-containing PVB films to water vapor. The sensitivity of laminated glass interlayer films to water vapor manifests itself, where appropriate, by progressive clouding of the edge of the film in the laminated glass panes from the outer edges of the laminated glass pane inwards in an atmosphere having a high content of water vapor at elevated temperature and over prolonged exposure times. It is therefore an important requirement to keep the susceptibility of the glass laminates to water vapor as low as possible.

Plasticizers which can be used in the plasticizer-containing polyvinylbutyrals according to the invention are all the known plasticizers or plasticizer mixtures which are compatible with PVB or with polyvinylacetals and are suitable for their plasticizing. A list of commercially available plasticizers, which contains data on their compatibility with PVB, can be found, for example, in the publication Modern Plastics Encyclopedia 1981/1982, pages 710 to 719. Preferred plasticizers are, for example, diesters of aliphatic diols, in particular of aliphatic polyether-diols or polyether-polyols, with aliphatic carboxylic acids, preferably diesters of polyalkylene oxides, in particular diesters of di-, tri-and tetraethylene glycol, with aliphatic ($C_6$–$C_{10}$)-carboxylic acids, preferably 2-ethylbutyric acid and n-heptanoic acid, and furthermore diesters of aliphatic or aromatic ($C_2$–$C_{18}$)-dicarboxylic acids, preferably adipic, sebacic and phthalic acid, with aliphatic ($C_4$–$C_{12}$)-alcohols, preferably dihexyl adipate.

The plasticizers are employed in customary amounts for plasticizing PVB, which are preferably in the range from 20 to 60% by weight, in particular 30 to 45% by weight, based on the PVB.

Instead of polyvinylbutyrals plasticized by admixing low molecular weight external plasticizers, internally plasticized polyvinylbutyrals, the melting point of which is below their decomposition point, can also be modified in an adhesion-reducing manner according to the invention and processed thermo-plastically, if appropriate without at the same time using low molecular weight external plasticizers.

The plasticized polyvinylbutyrals comprising adhesion-reducing additives according to the invention, plasticizers and, if appropriate, customary stabilizers and auxiliaries are preferably extruded by means of thermoplastic extrusion through flat sheet dies to give flat films which are preferably 0.2 to 2 mm thick and are suitable as lamina-ted glass interlayer films. The extrusion temperature of the extrusion molding compositions is in the customary range, preferably between 140° and 250° C., it also being possible for higher temperatures to be reached in the short term. Flat films can also be produced by thermo-plastic shaping of the plasticized PVB molding compositions which have been modified in an adhesion-reducing manner according to the invention on a heatable triple roll mill or a calender.

The extrusion molding compositions can comprise, as customary additives, inter alia, small amounts of alkali, preferably, for example, 0.001 to 0.1% by weight, based on the PVB, of alkali metal hydroxide or alkaline alkali metal salt, for stabilizing the PVB against acid hydrolysis. This alkali content is usually also called the alkali titer of the PVB. They can furthermore comprise light stabilizers, in particular UV light stabilizers, and antioxidants as other stabilizers.

In the case of film extrusion of plasticized polyvinylbutyrals, it is particularly important, where appropriate, to be able to extrude the composition at the highest possible melt temperatures so that the melt viscosity of the plasticized extrusion mass can be reduced as much as possible and kept as low as possible and the highest possible extruder throughputs per unit time can be achieved, without damaging the extrusion melt oxidatively and/or thermally and risking yellowing. These requirements can also be largely met by using plasticizer-containing PVBs which have been modified in an adhesion-reducing manner according to the invention.

The polyvinylacetals, preferably polyvinylbutyrals, used according to the invention can be prepared by methods which are known from the literature by acetalization of polyvinyl alcohols (PVAL) with aldehydes or low molecular weight aldehyde acetals under acid catalysis and under customary acetalization conditions, preferably in an aqueous or non-aqueous medium, in particular in an aqueous medium. The starting polyvinyl alcohols from which the polyvinylacetals are prepared preferably have molecular weights of 2000 to 250,000, in particular 10,000 to 150,000, and can be partly or completely hydrolyzed. The completely hydrolyzed PVAL types are particularly preferred, completely hydrolyzed PVALs being understood as meaning those in which at least 95 mol %, preferably 98 to 100 mol %, of the vinyl ester units originally present in the starting polyvinyl ester on which the PVAL is based are hydrolyzed to vinyl alcohol units.

In addition to acetal groups which are derived from butyraldehydes, the polyvinylbutyrals used according to the invention can also contain minor amounts, preferably less than 5 mol %, based on the total amount of acetal groups, of other acetal groups which are derived from aliphatic, cycloaliphatic or aromatic aldehydes, for example from formaldehyde, acetaldehyde, propionaldehyde, isononanaldehyde or benzaldehyde. Polyvinylbutyrals which are largely derived only from butyraldehydes, in particular from n-butyraldehyde, are preferred.

Overall, the acetalization of the PVAL should preferably affect not more than 85 mol %, in particular 80 to 30 mol %, particularly preferably 75 to 45 mol %, of the vinyl alcohol units originally present in the starting PVAL (=100 mol %). Polyvinylbutyrals used according to the invention therefore preferably contain 15 to 50% by weight, in particular 18 to 23% by weight, based on the PVB, of non-acetalized vinyl alcohol units. Mixing of the PVB with plasticizers and the other components and additives to be used according to the invention, with plasticizing of the mixture and thermo-plastic shaping thereof, preferably to films, can preferably be carried out, as already described above, in an extruder or also in a mixer and a heatable triple roll mill or calender.

For testing of the films in respect of their usability as interlayer films in siliceous laminated glass panes, flat films 0.8 mm thick are produced from plasticizer-containing polyvinylbutyrals according to the invention by the extrusion process and these are used as interlayer films in laminated glass panes for the production of laminated glass test specimens. For this purpose, in each case two sheets of float glass (Panilux ® glass) of size 30×30×0.2 cm washed with salt-free water and the plasticized PVB film to be tested, as the interleaving layer, are used to produce glass laminates in which in each case one tin side and one fire side of the glass faces the film, and the laminates are first pressed at 60° to 100° C., preferably 80° C., under a low pressing pressure, preferably 3 bar, to give a preliminary laminate, and are then pressed at 120° to 160° C., preferably 140° C., under 8 to 16 bar, preferably 12 bar, for a pressing time of 10 to 120 minutes, preferably 60 minutes, to give the finished glass laminate.

In the tests described in the examples which follow, the following test methods are used for evaluation of the breaking strength or break-through strength of the laminated glass panes, the sensitivity of the glass laminate interlayer films to water vapor and the color shade of the film.

The break-through strength is tested in accordance with ANSI 26.1-1983, No. 5.26, Test 26. A laminated glass pane of 30×30 cm temperature-controlled at 23° C. is laid horizontally in a frame. A steel ball of 2.26 kg is allowed to fall freely onto the center of this pane. The falling height at which the glass plate is no longer broken through on several repetitions is determined. This distance is stated as the falling ball height.

A falling height of at least 5.5 m must be achieved by technically usable glass laminates, regardless of the side of the glass laminate onto which the ball is thrown. It should be remembered that the float glass planes usually used have different surfaces: a fire side which was facing the heating burners during production, and a tin side which lay on the liquid tin bath. These surfaces have different properties in respect of adhesion to the glass by safety films and therefore also in respect of the breaking or break-through strength.

The so-called pummel test as described in GB-B 1 093 864 and in SAE (Society of Automotive Engineers) method 1208 furthermore is used to determine the adhesive strength between the plasticized laminated film and the glass surface. It is used to evaluate the adhesion between the glass and the plasticized plasticizer-containing PVB film after breaking of the laminated glass pane at low temperatures. In this test, the surface of the laminated glass pane, which has been cooled to −18° C. is shattered by blows with a special hammer. The adhesive strength is evaluated according to the proportion of the area of the interlayer film covered by glass splinters which have remained adhered, and is stated in numerical values from 0 to 10 (0=no adhesion, 10=complete adhesion). Optimum breaking strength of laminated glass panes is as a rule achieved when the pummel value is between 2 and 6, preferably between 3 and 5.

To characterize the intrinsic color of the films (yellow to brown coloration), the so-called yellowness index YI and the blue-yellow shift b are measured with a spectrometer (Labscan ® 5100) in accordance with ASTM-D-1925. The differences between these values and measurements on the film-free glass panes are stated as ΔYI and Δb, small numerical values denoting colorlessness to pale yellow shades.

The color shade stability of glass laminate films under the action of high temperatures and/or severe shear stress is determined by kneading 50 g of the plasticizer-containing PVB film composition in a kneading apparatus running at 50 revolutions/minute (model Brabender W50EC) at 150° C. for 15 minutes. The color of a sample shaped to give a strand is then measured in a Hellige ® colorimeter in comparison with a color scale which indicates values from 1 (colorless) to 18 (brown). Films accordingly tend to discolor less, the lower the kneader color number determined.

The edge clouding of glass laminate films is evaluated in accordance with ANSI 26.1-1977, No. 5.3, Test 3, measuring the widthwise extent (in millimeters) to which any cloudy edge strip extends into the inside of a laminated pane which has been stored in a saturated water vapor atmosphere at 50° C. for 14 days.

The invention is illustrated in more detail by the following examples.

Examples 1 to 8

In Examples 1 to 8, in each case 100 parts by weight (PW) of commercially available polyvinylbutyral suitable for the production of laminated glass films (®Mowital B 62 SF, manufacturer: Hoechst AG) are mixed with in each case 33 PW of the plasticizer di-n-hexyl adipate, in which the total amount of the particular adhesion-reducing additive according to the invention listed in the following Table 1, columns 2 and 3, is dissolved, and, after the plasticizer has been absorbed by the PVB, the mixture is homogenized in a Leistritz twin-screw extruder at 180° C. and extruded through a slot die to give in each case a flat film 0.8 mm thick.

Glass laminate test specimens are produced with the resulting flat films as the interlayer film and in each case two float glass panes of dimensions 30×30×0.2 cm as already described in the above description. The break-through strength (falling ball height), the breaking strength (pummel value) and the edge clouding (width in mm) are measured on laminated glass test specimens produced in this way or on sections thereof.

The color shade values ΔYI and Δb are determined on glass laminate test specimens produced specifically for these measurements, while the color shade stability is determined on the plasticized plasticizer-containing PVB film composition in the kneader experiment, as already described in the above description, and is stated as the kneader color number. The results of Examples 1 to 8 are summarized in the following Table 1, the nature and concentration of the particular adhesion-reducing additive according to the invention used being stated in columns 2 and 3 of Table 1.

Comparison Examples 1 and 2

In an analogous manner to that described in Examples 1 to 8, plasticized plasticizer-containing PVB flat films 0.8 mm thick are produced in a comparable manner by extrusion and thermo-plastic shaping, with the modification that instead of the adhesion-reducing additives according to the invention, potassium acetate is now added in Comparison Example 1 as a known adhesion-reducing standard additive which is not according to the invention, and untreated colophony in its natural resin acid, non-neutralized form is added in Comparison Example 2. The added amounts used in each case for film production and the results of the measurements on the test specimens produced with the film material are likewise summarized in Table 1.

TABLE 1

Measurement results from Examples 1 to 8 and Comparison Examples 1 and 2

| Example No. | Nature of the adhesion-reducing additive | % by weight of the adhesion-regulating additive in the film | Falling ball height fire side (m) | Falling ball height tin side (m) | Pummel value fire side | Pummel value tin side | ΔYI | Δb | Kneader color number | Edge clouding (mm) |
|---|---|---|---|---|---|---|---|---|---|---|
| 1 | A | 0.066 | 6 | 5.5 | 1 | 3 | 0.90 | 0.51 | 4 | 2.0 |
| 2 | A | 0.033 | 6 | 6.5 | 6 | 8 | 0.87 | 0.46 | 5 | 2.0 |
| 3 | B | 0.030 | 5 | 6 | 4.5 | 7 | 0.46 | 0.28 | 5 | 2.1 |
| 4 | C | 0.050 | 6 | 5.5 | 3 | 7 | 0.64 | 0.36 | 4 | 2.2 |
| 5 | D | 0.060 | 5.5 | 6 | 1.2 | 3.5 | 0.42 | 0.26 | 4 | 1.2 |
| 6 | D | 0.050 | 5.5 | 6 | 3 | 3.5 | 0.39 | 0.25 | 5 | |
| 7 | E | 0.05 | 5.5 | 5.5 | 2.5 | 2.0 | 0.80 | 0.43 | 4 | 0.8 |
| 8 | F | 0.05 | 5.5 | 6 | 4.5 | 2.5 | 0.6 | 0.35 | 5 | 0.2 |
| Comparison Example No. | | | | | | | | | | |
| 1 | Potassium acetate "standard" | 0.04 | 5 | 5.5 | 4.5 | 4.5 | 1.06 | 0.52 | 9 | 3.9 |
| 2 | Colophony | 0.1 | n. meas. | n. meas. | 9 | 7 | n. meas. | n. meas. | 5 | 2.6 |

A = Calcium salt of a reaction product of 1 mol of colophony with 0.25 mol of formaldehyde
B = Calcium salt of a reaction product of 1 mol of colophony with 1 mol of formaldehyde
C = Zinc salt of a reaction product of 1 mol of colophony with 1 mol of formaldehyde
D = Calcium/magnesium mixed salt of a reaction product of 1 mol of colophony with 1 mol of formaldehyde
E = Calcium/magnesium salt of colophony
F = Zinc/magnesium salt of hydrogenated colophony (Staybelite Resin E from Hercules Powder Inc.)
n. meas. = not measured As the results of Examples 1 to 8 in Table 1 show, overall significantly better values of properties result with the adhesion-regulating additives according to the invention in the laminated glass films, especially in the pummel test, in the color shade values and in the edge clouding, in comparison with the corresponding standard values of Comparison Example 1 and the values with colophony free from metal salt groups in Comparison Example 2.

I claim:

1. A plasticizer-containing polyvinlbutyral suitable for the production of interlayer films for laminated glass panes of siliceous glass and comprises adhesion-reducing additives and optionally customary stabilizers and auxiliaries, which polyvinylbutyral comprises, as adhesion-reducing additives, salts of metals from groups Ia, IIa, IIb or IIIa of the periodic table of the elements with colophony or colophony derivatives selected from the group consisting of partly or completely hydrogenated, dimerized, disproportionated colophony and reaction products of colophony with aldehydes.

2. A plasticizer-containing polyvinylbutyral of claim 1 wherein the plasticizer content is 20 to 60% by weight, based on the PVB.

3. A plasticizer-containing polyvinylbutyral of claim 1 wherein the content of metal salts of colophony or colophony derivatives is 0.01 to 0.2% by weight, based on the plasticizer-containing polyvinylbutyral.

4. A plasticizer-containing polyvinylbutyral of claim 1 which comprises metal salts selected from the group consisting of calcium salts, magnesium salts and zinc salts of colophony or colophony derivatives.

5. A plasticizer-containing polyvinylbutyral as claimed in claim 1 which comprises metal salts of reaction products of colophony with 0.1 to 12% by weight, based on colophony, of a member selected from the group consisting of aliphatic aldehydes of 1 to 7 carbon atoms, benzaldehyde, furfural and glyoxal.

6. A plasticizer-containing polyvinylbutyral as claimed in claim 1 which comprises metal salts of reaction products of colophony or colophony metal salts with 0.1 to 3% by weight, based on the colophony or colophony metal salts, of a $C_3$–$C_{18}$ ethylenically unsaturated acid selected from the group consisting of monocarboxylic acids, dicarboxylic acids and dicarboxylic acid anhydrides.

7. A plasticizer-containing polyvinylbutyral as claimed in claim 1 which comprises metal salts of reaction products of colophonyl or of colophonyl salts with 0.1 to 10% by weight, based on the colophony or the metal salts thereof, of a phenol-aldehyde novalak or resol.

8. A plasticizer-containing polyvinylbutyral as claimed in claim 1 which is in the form of a plasticized film.

9. A plasticizer-containing polyvinylbutyral film of claim 8 containing 3 to 45% by weight of plasticizer based on PVB.

10. A polyvinylbutyral of claim 3 wherein the content of the metal salts is 0.015 to 0.1% by weight based on the plasticizer-containing polyvinylbutyral.

11. A polyvinylbutyral of claim 3 wherein the content of the metal salts is 0.2 to 0.60% by weight, based on the plasticizer-containing polyvinylbutyral.

12. A polyvinylbutyral of claim 6 wherein the content of the reaction product is 0.2 to 1% by weight.

13. A polyvinylbutyral of claim 8 wherein the film is 0.2 to 2 mm thick.

14. A polyvinylbutyral of claim 8 wherein the film is about 0.8 mm thick.

* * * * *